US008565980B2

United States Patent
Alford et al.

(10) Patent No.: US 8,565,980 B2
(45) Date of Patent: Oct. 22, 2013

(54) COMPENSATION OF REDUCED BRAKING EFFECT OF A HYDRAULIC BRAKE SYSTEM FOR A LAND CRAFT

(75) Inventors: Nicholas Alford, Waldesch (DE); Josef Knechtges, Mayen (DE); Andreas Marx, Kalt (DE); Michael Schwarz, Koblenz (DE)

(73) Assignee: Lucas Automotive GmbH, Koblenz (DE)

( * ) Notice: Subject to any disclaimer, the term of this patent is extended or adjusted under 35 U.S.C. 154(b) by 1303 days.

(21) Appl. No.: 11/921,713

(22) PCT Filed: Jun. 8, 2006

(86) PCT No.: PCT/EP2006/005494
§ 371 (c)(1),
(2), (4) Date: Jan. 29, 2009

(87) PCT Pub. No.: WO2006/131369
PCT Pub. Date: Dec. 14, 2006

(65) Prior Publication Data
US 2009/0306871 A1    Dec. 10, 2009

(30) Foreign Application Priority Data
Jun. 9, 2005  (DE) .......................... 10 2005 026 734

(51) Int. Cl.
*G06F 17/00* (2006.01)
*G06F 19/00* (2011.01)
*B60T 13/66* (2006.01)
*B60T 13/68* (2006.01)

(52) U.S. Cl.
USPC ............ 701/45; 701/70; 303/9.62; 303/9.64; 303/10; 303/20

(58) Field of Classification Search
USPC ............ 701/1, 29, 70, 71, 78, 83, 36, 45, 82, 701/29.1; 303/115.1–115.4, 116.1, 3, 10, 303/13, 114.1; 180/271
See application file for complete search history.

(56) References Cited

U.S. PATENT DOCUMENTS

| | | | |
|---|---|---|---|
| 5,727,852 A | | 3/1998 | Pueschel et al. |
| 5,884,986 A | * | 3/1999 | Shimizu .................. 303/122.12 |
| 5,887,954 A | * | 3/1999 | Steiner et al. .............. 303/113.4 |
| 5,992,952 A | * | 11/1999 | Kubota ........................ 303/191 |
| 6,270,171 B1 | | 8/2001 | Krieg et al. |
| 2002/0038977 A1 | | 4/2002 | Nitta et al. |
| 2005/0173978 A1 | | 8/2005 | Fennel et al. |

FOREIGN PATENT DOCUMENTS

| | | |
|---|---|---|
| DE | 195 01 760 A1 | 7/1996 |
| DE | 199 36 435 A1 | 5/2000 |

(Continued)

*Primary Examiner* — Thomas Tarcza
*Assistant Examiner* — Edward Pipala
(74) *Attorney, Agent, or Firm* — MacMillan, Sobanski & Todd, LLC

(57) ABSTRACT

The invention relates to a hydraulic brake system and a method for controlling a hydraulic brake system for a land vehicle having a predetermined holding capacity for hydraulic fluid and at least one wheel brake. The invention is characterized by detecting if a current holding capacity of the brake system has increased in relation to the predetermined holding capacity and, if so, by feeding hydraulic fluid to the at least one wheel brake in a controlled manner and an amount corresponding at least to the increase in capacity.

22 Claims, 1 Drawing Sheet

(56) References Cited

FOREIGN PATENT DOCUMENTS

| DE | 101 47 351 A1 | 6/2002 |
| WO | WO 98/43857 | 10/1998 |
| WO | WO 02/070312 A1 | 9/2002 |
| WO | WO 03/093082 A1 | 11/2003 |

* cited by examiner

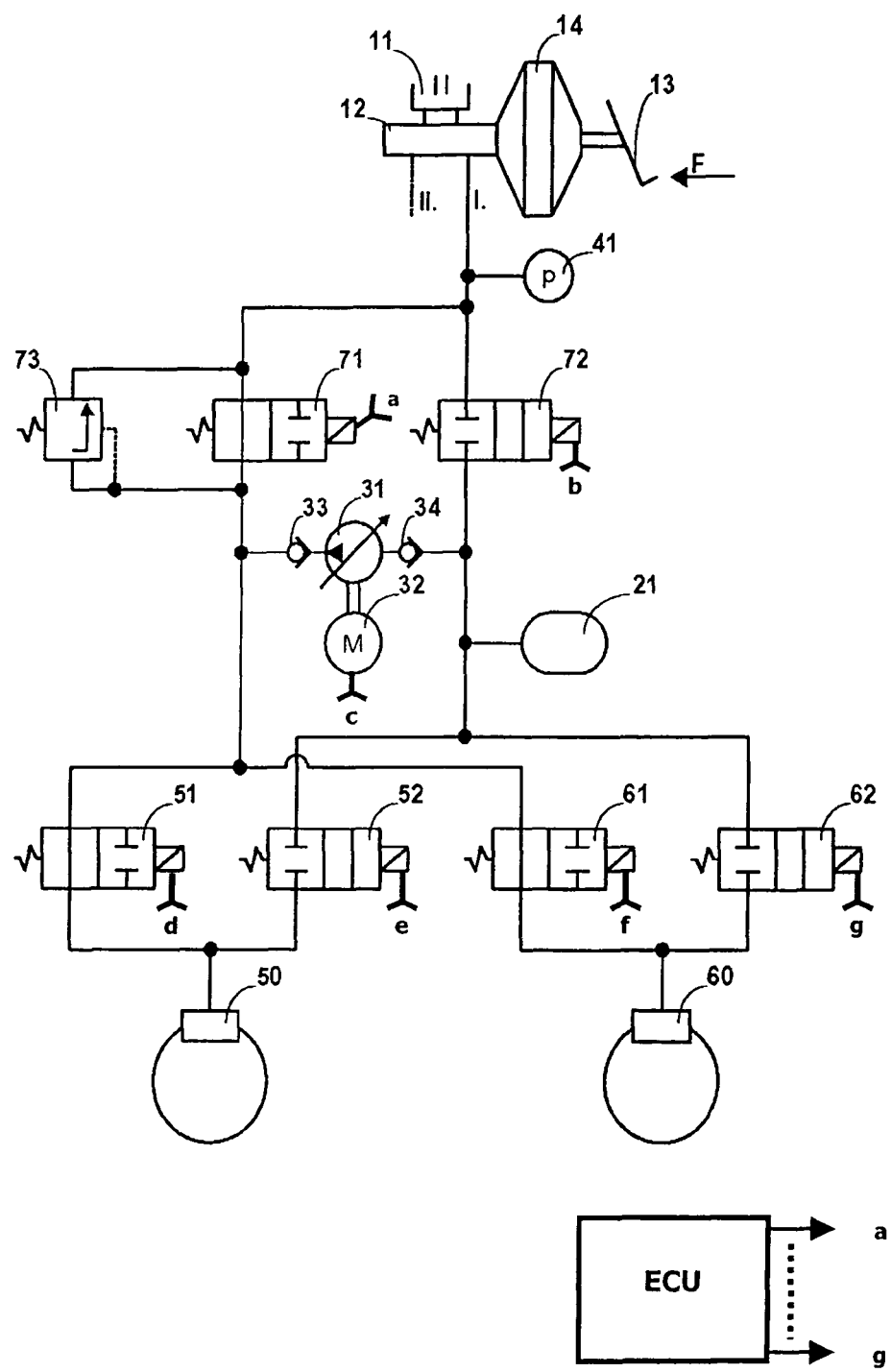

COMPENSATION OF REDUCED BRAKING EFFECT OF A HYDRAULIC BRAKE SYSTEM FOR A LAND CRAFT

CROSS-REFERENCE TO RELATED APPLICATIONS

This application is a National stage of International Application No. PCT/EP2006/005494 filed Jun. 8, 2006, the disclosures of which are incorporated herein by reference, and which claimed priority to German Patent Application No. 10 2005 026 734.3 filed Jun. 9, 2005, the disclosures of which are incorporated herein by reference.

BACKGROUND OF THE INVENTION

This invention concerns, in general, brake systems for land vehicles, and in particular, compensation for operational states of such brake systems with reduced braking effect.

In the case of brake systems for land vehicles, it is known that their braking effect falls when they are very stressed. This is also called "fading". The causes of it include the temperatures which occur with high stress (e.g. at high braking pressures), and which cause increased volume holding capacity for the hydraulic fluid of the brake system as a whole, and in particular of individual wheel brakes. In this way, for instance, it can happen that displacement reserves of individual components of a brake system (e.g. main cylinder, brake servo, brake pedal) are used up before a sufficient braking pressure can be generated. The result can be that the brake system cannot provide a braking effect which the driver wants.

BRIEF SUMMARY OF THE INVENTION

The object of the invention is, in the case of hydraulic brake systems, to compensate at least partly for reduced braking effect (fading).

To achieve said object, this invention provides a brake system and a method according to the independent claims.

The hydraulic brake system according to the invention is intended for a land vehicle, and has a controller with inputs to receive input parameters which indicate operational states of the land vehicle, and outputs to output control signals for the brake position. The hydraulic brake system also includes at least one wheel brake and at least one hydraulic fluid reservoir, to store hydraulic fluid. To convey hydraulic fluid in the brake system in a controlled manner, a controllable pump, which is intended in particular to feed hydraulic fluid in a controlled manner to the at least one wheel brake, is provided. The hydraulic brake system has, in predetermined parts, regions and/or components, a predetermined holding capacity, holding power or volume holding for hydraulic fluid. The predetermined holding capacity can, for instance, be present in the at least one wheel brake, and/or hydraulic connections or lines, which feed hydraulic fluid to and from the at least one wheel brake.

Here, below and in particular in the claims, "set up" should be understood as meaning that the controller is implemented at least structurally to provide the technical functional features which are given in each case. Additionally, the controller can be programmed to provide the technical functional features which are given in each case, e.g. using software code or computer programs. It is thus intended that the functions of the controller are provided by a corresponding hardware structure (e.g. ASIC). The controller can also be implemented so that it has a generally usable hardware structure, which in association with appropriate programming (e.g. permanently implemented software code, computer program which is provided on a computer-readable storage medium, software code or computer program which can be downloaded for operation) provides the technical functional features of the controller.

According to the invention, it is provided that the controller can determine, from the input parameters, a current holding capacity of the brake system for hydraulic fluid. If it is established that the current holding capacity is raised compared with the predetermined holding capacity, i.e. the predetermined parts, regions and/or components of the brake system can hold more hydraulic fluid, according to the invention it is provided that the controller provides control signals, to operate the pump so that a quantity of hydraulic fluid corresponding at least to the capacity increase is fed to the at least one wheel brake. This feeding of hydraulic fluid can also be called "prefilling" or "topping up" the at least one wheel brake with hydraulic fluid.

In one embodiment, the at least one wheel brake is "predictively prefilled".

In this case, it is provided that the controller determines the current holding capacity during an operational state of the brake system in which the brake system is not actuated, i.e. generates no braking effect.

It is also provided that the controller provides control signals for the pump in such a way that a suitable quantity of hydraulic fluid to compensate for the capacity increase is also fed to the at least one wheel brake during such an unactuated operational state of the brake system. In particular, it is provided that a first quantity of hydraulic fluid, corresponding essentially to the capacity increase, is fed to the at least one wheel brake.

Preferably, hydraulic fluid which is stored in a hydraulic fluid reservoir, which is used to supply a main cylinder of the brake system, is used in this embodiment.

The brake system can include a valve arrangement, which in a first operational state blocks a first hydraulic connection for feeding braking pressure which a driver generates to the at least one wheel brake, and in a second operational state makes the first hydraulic connection. In this case it is provided that the controller, if an increased holding capacity is determined, can produce control signals for the valve arrangement, to bring the valve arrangement into the first operational state.

In a third operational state, the valve arrangement can block the first hydraulic connection and also block a second hydraulic connection, which is provided between the input side of the pump and the hydraulic fluid reservoir. In this case it is provided that the controller can generate control signals for the valve arrangement, said control signals bringing the valve arrangement into the third operational state, and can also provide control signals for the pump, said control signals ending the operation of the pump if the first quantity of hydraulic fluid is fed.

Preferably, in the case of this embodiment, the control signals of the controller to operate the pump to feed hydraulic fluid to the at least one wheel brake are provided at an instant which depends on at least one of the input parameters. In particular, in this case it is provided that these control signals are provided at an instant following which actuation of the brake system, i.e. initiation of a braking process, is expected.

In another embodiment, the controller determines the current holding capacity during an operational state of the brake system in which the brake system is actuated, i.e. generates braking effect.

In contrast to the previous embodiment, this embodiment ensures not "predictive prefilling" but "topping up" the at least one wheel brake during a braking process. With this embodiment, vehicle safety is considerably increased, since brake fading is counteracted even in the extreme case that the available actuation displacement of the brake pedal, because of the increased volume holding capacity of the brake system, is (completely) used up, because the pedal itself or the pistons of the main cylinder have reached the limit stop.

In this case it is provided that the controller can provide control signals for the pump, to feed a suitable quantity of hydraulic fluid for holding capacity compensation to the at least one wheel brake during such an actuated operational state of the brake system. In particular, it is provided that a second quantity of hydraulic fluid should be fed to the at least one wheel brake, said quantity of hydraulic fluid leading to an operational state of the at least one wheel brake in which anti-lock regulation is necessary to prevent locking or tendency to lock of the wheel brake(s) or associated wheels.

This embodiment too can include the above-mentioned valve arrangement with first and second operational states. However, it is provided here that if the valve arrangement has the second operational state, the controller can provide, for the pump, control signals which cause the second hydraulic fluid quantity to be fed to the at least one wheel brake.

Preferably, the second hydraulic fluid quantity is fed out of a hydraulic fluid reservoir which is a low pressure hydraulic fluid reservoir of the brake system, and is used to hold hydraulic fluid which flows out of wheel brakes during a pressure reduction phase of anti-lock regulation.

Preferably, the brake system is controlled so that the second hydraulic fluid quantity, which results in an operational state which requires anti-lock regulation, is fed to one or more wheel brakes, which is or are provided for a front axle or front wheels of the land vehicle.

Preferably, the controller determines the current holding capacity or holding capacity increase on the basis of input parameters, which allow statements about temperatures and/or temperature changes of the brake system in the parts, regions and/or components for which the current holding capacity and/or holding capacity increase is to be determined.

The method according to the invention is intended to control a hydraulic brake system of a land vehicle, a brake system which has at least one wheel brake and a predetermined holding capacity for hydraulic fluid in predetermined parts, regions and/or components being assumed. In the method according to the invention, whether a current holding capacity of these parts, regions and/or components of the brake system has increased compared with the predetermined holding capacity is determined. If so, hydraulic fluid is fed to the at least one wheel brake in a controlled manner and an amount corresponding at least to the increase in capacity.

Other advantages of this invention will become apparent to those skilled in the art from the following detailed description of the preferred embodiments, when read in light of the accompanying drawings.

BRIEF DESCRIPTION OF THE DRAWING

FIG. 1 is a schematic representation of a brake system according to the invention.

DETAILED DESCRIPTION OF THE INVENTION

FIG. 1 shows a schematic representation of a preferred embodiment of a brake system. The brake system works by means of hydraulic fluid, which is partly stored in a container 11. To generate braking pressure which results from the hydraulic fluid being put under pressure, a main cylinder 12, which the driver can actuate through a pedal 13, is used. As shown in the figures, optionally a brake servo 14, which is arranged between the main cylinder 12 and the pedal 13, can be provided, to amplify a force F which the driver introduces, preferably pneumatically or hydraulically.

Starting from the main cylinder 12, a first and second brake circuit I, II are supplied, each brake circuit including two wheel brakes. Depending on which wheel brakes of the vehicle are included in which brake circuit, the result is a division between front and rear axles, in which one brake circuit can include wheel brakes of the front axle and the other brake circuit can include wheel brakes of the rear axle, or one brake circuit can include the wheel brake of one front wheel and the wheel brake of the diagonally opposite rear wheel and the other brake circuit can include the wheel brakes of the other front wheel and the other rear wheel.

Below, it is assumed that brake circuits I and II are of essentially identical structure. Therefore, only brake circuit I is shown in detail. The following explanations referring to brake circuit I apply correspondingly to brake circuit II.

Brake circuit I includes two wheel brakes 50 and 60. To control braking pressure courses in the wheel brakes 50 and 60, a first valve arrangement including valves 51 and 52 and a second valve arrangement including valves 61 and 62 are provided.

The valves 51, 52, 61 and 62 are shown here as 2/2-way valves which can be actuated by electromagnets.

Brake circuit I includes a valve device with valves 71, 72 and 73. The valves 71 and 72 are shown here as 2/2-way valves which can be actuated by electromagnets.

FIG. 1 shows the valves 51, 61 and 71 each in an open operational state or through-flow position, whereas the valves 52, 62 and 72 are each shown in a closed operational state or blocked position. These operational states or positions are also called "initial position" below.

In the operational state of brake circuit I shown in FIG. 1, because of the open operational state of the valve 71, there is a hydraulic connection between the main cylinder 12 and the wheel brakes 50 and 60. This operational state is used for braking processes which can be controlled via actuations of the pedal 13, and which can also be called normal braking processes. Actuations of the main cylinder 12 by means of the pedal 13, optionally with the support of the brake servo 14, generate braking pressures in brake circuit I and thus in the wheel brakes 50 and 60.

The shown brake system is designed for so-called anti-lock regulation, in which, during a braking process, locking of the wheels should be prevented. For this purpose, braking pressures acting in the wheel brakes 50 and 60 are modulated individually. This is done by setting up pressure buildup, pressure holding and pressure reduction phases, which alternate in time sequence, and which are explained in more detail below.

The pressure buildup, pressure holding and pressure reduction phases are achieved by suitable control of the valves 51, 52 and 61, 62 which are associated with the wheel brakes 50 and 60 by means of an electronic control unit ECU.

The electronic control unit ECU can receive signals giving the operational states of a vehicle via a series of inputs (not shown). For instance, it is intended that signals from wheel rotational speed sensors, yaw velocity sensors, transverse acceleration sensors etc. should be fed to the electronic control unit ECU.

The electronic control unit ECU has outputs for control signals a, . . . , g to control the valves 51, 52, 61, 62, 71 and 72 and to control a motor 32, which is provided to operate a pump 31.

In the case of a driver-controlled normal braking process with anti-lock regulation, control is by the electronic control unit ECU, depending on measured values (e.g. speed, acceleration, wheel rotational speed, yaw velocity, transverse acceleration etc.) which indicate the operational states of the vehicle, and measured values which indicate a braking process which the driver wants (e.g. actuation of the pedal 13, hydraulic pressure at the output of the main cylinder 12 etc.). The braking process which the driver wants can also be determined via the braking pressure P which is generated in the main cylinder 12, to capture which a sensor 41 is provided.

During a normal braking process without anti-lock regulation, the valves 51, 52 and 61, 62 are each in their initial positions. If the electronic control unit ECU establishes, for instance, that the wheels associated with the wheel brakes 50 and 60 are tending to lock or locking, the electronic control unit ECU effects a pressure holding phase for each of the wheel brakes 50 and 60. If the result of the pressure holding phases is not that the tendency to lock or locking ends, the electronic control unit ECU effects a pressure reduction phase for each of the wheel brakes 50 and 60, until the tendency to lock or locking is ended. This is followed, under the control of the electronic control unit ECU, by pressure buildup phases for the wheel brakes 50 and 60, in which the braking pressures acting in the wheel brakes 50 and 60 are built up according to the braking process which the driver wants.

During the pressure holding phases, under the control of the electronic control unit ECU, the valves 51 and 61 are each brought into a closed operational position or blocked position. The valves 52 and 62 remain in their initial positions which exist in the normal braking process.

Closing the valves 51 and 61 results in hydraulic disconnection of the wheel brakes 50 and 60, so that the braking pressures acting in the wheel brakes 50 and 60 are kept constant.

During the pressure reduction phases, the valves 51 and 61 are held in their operational positions, and the valves 52 and 62 are controlled by the electronic control unit ECU so that they each take on an open operational state or through-flow position. Because of the open valves 52 and 62, hydraulic fluid can flow out of the wheel brakes 50 and 60, so that the braking pressures acting in the wheel brakes 50 and 60 are reduced. Hydraulic fluid which flows out can be stored temporarily in a low pressure reservoir 21.

During a pressure buildup phase, the valves 51, 52 and 61 and 62 take their initial positions, i.e. the valves 51 and 61 are opened by the electronic control unit ECU, whereas the valves 52 and 62 are closed. To increase the braking pressures in the wheel brakes 50 and 60, which were reduced in the pressure reduction phases, the electronic control unit ECU controls the motor 32 and thus the pump 31 so that via the valves 51 and 61, the braking pressures acting in the wheel brakes 50 and 60 are raised to the level corresponding to the braking process which the driver wants. The pump 31 conveys hydraulic fluid which has flowed out in the pressure reduction phases back out of the low pressure reservoir 21 as required.

The pump 31, which is implemented as, for instance, a radial piston pump, is blocking against its conveying direction, e.g. by means of a non-return valve 33 at the output of the pump 31 and a non-return valve 34 at the input of the pump 31.

The rotational speed of the electric motor 32 can be adjusted and/or regulated via the control signal c of the electronic control unit ECU, so that the delivery rate of the pump 31 can be controlled. The electric motor 32 can simultaneously actuate a pump (not shown here) of the second brake circuit II.

Automatic braking processes usually take place independently of a force F which the driver introduces on the pedal 13. These are, for instance, drive slip regulation, which prevents wheel spin of individual wheels in a startup process by targeted braking, driving dynamics regulation, which adjusts the vehicle behaviour in the limit range to the driver's wishes and the carriageway conditions by targeted braking of individual wheels, or adaptive speed regulation, which maintains a distance between one's own vehicle and a vehicle in front by, among other things, automatic braking.

For an automatic braking process, the valves 71 and 72 are controlled by the electronic control units ECU so that the valve 71 takes a closed operational state or blocked position, and the valve 72 takes an open operational state or through-flow position. The valves 51, 52, 61 and 62 remain in their initial positions. Because of the closed valve 71, the open valves 51 and 61 and the closed valves 52 and 62, the wheel brakes 50 and 60 are disconnected from the main cylinder 12 and brake circuit II to the extent that no braking pressures which are fed from outside, i.e. braking pressures which are caused by actuation of the pedal 13, can be fed to them. Even the open valve 72 allows no feeding of external braking pressure, because the valves 52 and 62 are closed and the pump 31 also acts as a closed valve. However, the open valve 72 also enables the pump 31 to suck hydraulic fluid out of the container 11, to generate braking pressures in the wheel brakes 50 and 60, as described in detail below.

To generate braking forces which are wanted for automatic braking processes in the wheel brakes 50 and 60, the electronic control unit ECU controls the motor 32 and pump 31 correspondingly. For modulation or fine adjustment of the braking pressures in the wheel brakes 50 and 60, the electronic control unit ECU can control the valves 51, 52 and 61, 62 comparably to the anti-lock regulation described above.

To avoid damage to brake circuit I, the valve 73 can be provided in the form of a pressure limiting valve. The valve 73, which is normally in a closed operational state, takes an open operational state which reduces braking pressure if the pressure at the output of the pump 31 is too high.

In operation of a brake system such as is described above, reduced or decreasing braking effects can occur. "Reduced or decreasing braking effect" should be understood here as meaning, in particular, that the brake system must be actuated more strongly or more and more strongly, to achieve a desired braking effect. Such worsened braking effects are also called "fading", and in general occur when the brake system is very stressed. "The brake system is very stressed" should be understood here as meaning, in particular, that operation of the brake system results in heating components, particularly wheel brakes, which carry hydraulic fluid. The result of the heating can be an increased holding capacity or holding power of components which carry hydraulic fluid compared with the unheated state. The consequence is that more hydraulic fluid is required to generate a desired braking pressure.

In the case of automatic braking processes, this can be achieved by a pump of a brake circuit which has an increased holding capacity for hydraulic fluid being operated so that hydraulic fluid is fed until the desired braking pressure is reached. This has the disadvantage that, with equal pumping rate, the desired braking pressure is reached more slowly. Increasing the pumping rate to reduce the time until a desired braking pressure is generated, or to keep it equal compared with a state with normal holding capacity, is possible, if at all, only to a limited extent, depending on the design of the brake circuit and in particular of the pump.

In the case of braking processes in which braking pressure is at least partly built up by the driver, the quantity of hydraulic fluid which is required because of a capacity increase can be provided by the driver actuating the brake system more strongly, i.e. pressing the brake pedal further down. In this case, displacement reserves of brake system components which the driver has actuated directly and indirectly may not be enough to generate even high braking pressures, e.g. for full braking. Even if the driver, by corresponding stronger actuation of the brake system, can compensate for its increased holding capacity for hydraulic fluid, with equal actuation speed desired braking pressures are generated more slowly. To generate a desired braking pressure more quickly, the driver can actuate the brake system more quickly, i.e. press the brake pedal down more quickly, but this can result in unwanted, unpleasant and critical braking processes. However, these procedures are insufficient, at the latest, when no reserves are available to raise the braking pressure further.

To solve this problem, according to the invention, in general it is intended that, if in a brake system there is worsened braking effect because of increased holding capacity for hydraulic fluid, a quantity of hydraulic fluid corresponding at least to the capacity increase should be fed.

Below, to illustrate this procedure, preferred embodiments in which increased holding capacity for hydraulic fluid is established, on the one hand before a braking process and on the other hand during a braking process, are explained.

In one embodiment, whether the holding capacity of brake circuit I and/or brake circuit II has increased compared with the normal state, or it is to be assumed or expected that a holding capacity increase is present or can occur, is determined. To determine, estimate or predict a worsened braking effect of the brake position, various parameters can be used. For instance, it is intended that one or more of the following parameters should be used, in particular to determine, directly and indirectly, brake system temperatures which are relevant to a holding capacity increase:

temperatures of the wheel brakes 50, 60 number of actuations of the brake pedal 13 within a predefined period, optionally in association with braking pressures generated in the main cylinder 12 ratio of wheel rotational speeds and vehicle decelerations pumping duration and/or pumping rate of the pump(s) 31

These parameters should be understood as examples only. Every parameter which allows statements about the holding capacity for hydraulic fluid can be used.

To determine, estimate or predict a holding capacity change, the control unit ECU receives, via one or more of its inputs, one or more input parameters, which allowed statements about the current holding capacity of the brake system, preferably about the current holding capacity of each brake circuit.

If the control unit ECU determines an operational state of the brake system which has resulted, is resulting or according to expectation can result in a worsened braking effect, the control unit ECU controls the brake system as explained below on the basis of brake circuit I.

In this embodiment, the brake system is controlled to compensate for a worsened braking effect by the control unit ECU, if the brake system is not being actuated. First, the control unit ECU controls the valve 71 and valve 72 so that the valve 71 takes a closed operational state or blocked position, and the valve 72 takes an open operational state or through-flow position. Also, the pump 31 is controlled to suck hydraulic fluid out of the hydraulic fluid reservoir or container 11 via the valve 72 and feed it to the wheel brakes 50 and 60. The wheel brakes 50 and 60 are "prefilled" with a quantity of hydraulic fluid, to compensate for the increased holding capacity of brake circuit I, before a braking process takes place. In particular, it is intended here that a hydraulic fluid quantity corresponding to the capacity increase should be fed to the wheel brakes 50 and 60.

If the quantity of hydraulic fluid to compensate for the increased holding capacity is fed, and if no braking process has (yet) been initiated, the control unit ECU can control the valve 72 so that it takes a closed operational position or blocking position. This prevents a flow of hydraulic fluid out of the wheel brakes 50 and 60, and holds the hydraulic fluid which is fed for prefilling in the wheel brakes 50 and 60. It is also provided that the control unit ECU controls the pump 31 so that it feeds no more hydraulic fluid, e.g. from the hydraulic fluid reservoir or low pressure reservoir 21, to the wheel brakes 50 and 60.

When the driver actuates the brake system, the control unit ECU controls the valve 71 so that it takes an open operational position or through-flow position. This makes it possible to build up braking pressure in the wheel brakes 50 and 60 by actuating the pedal 13 as described above. If the brake system is actuated by the driver, and if the valve 72 is closed to keep hydraulic fluid in the wheel brakes 50 and 60, the control unit ECU keeps the valve 72 in this operational position. Otherwise, the control unit ECU brings the valve 72 out of the open operational position into the closed operational position or blocking position. It is also provided that the pump 31 is controlled so that it can be operated in the way which is intended for braking processes which the driver controls (e.g. anti-lock regulation).

What is achieved by the quantity of hydraulic fluid which is fed to the wheel brakes 50 and 60, before the driver actuates the brake system, to compensate for the increased holding capacity, is that the quantity of hydraulic fluid which is fed to brake circuit I by actuating the pedal 13 is not used to compensate for the increased holding capacity, but essentially causes a braking pressure increase, which causes a braking effect, without loss.

If, before the wheel brakes 50 and 60 are prefilled, the brake system is operated for an automatic braking process, the valve 71 is kept in the closed operational position or blocking position. The valve 72 is also kept in its previous position, namely the open operational position or through-flow position, if the valve 72 was not closed, as described above, to keep hydraulic fluid in the wheel brakes 50 and 60. Additionally, the control unit ECU controls the pump 31 so that a desired automatic braking process takes place.

Here the consequence of prefilling the wheel brakes 50 and 60 is that when a braking process is carried out, the pump 31 does not have to feed any hydraulic fluid to the wheel brakes 50 and 60 to compensate for the increased holding capacity, since this has already been done before the automatic braking process was initiated.

Preferably, the wheel brakes 50 and 60 are prefilled depending on operational or driving states of the land vehicle. For instance, it is provided that prefilling the wheel brakes 50 and 60, if required, should be initiated, if the control unit ECU identifies an operational or driving state which causes a braking process to be expected. For instance, it is possible to feed parameters which indicate actuation-dependent positions and/or movements of an accelerator pedal to the control unit ECU, e.g. so that a change from the accelerator pedal to the brake pedal 13, and thus a braking process to be expected, can be detected. Also other parameters, which indicate driving or operational states of the vehicle which may lead to a braking process are provided, e.g. critical driving states when driving round bends at high speed, distance from vehicles in front, and similar.

In another embodiment, in which no "predictive" prefilling of the wheel brakes 50 and 60 is provided, compensation for an increased holding capacity for hydraulic fluid takes place during a braking process.

During a braking process, to compensate for an increased holding capacity, in particular on the basis of brake system temperatures which are relevant to it, alternatively or additionally to the above-mentioned parameters, one or more of the following parameters can be used:

braking pressure generated in the main cylinder 12 during the braking process brake temperature(s), in particular on a front axle ratio of vehicle deceleration and braking pressure generated in the main cylinder 12

If the control unit ECU has detected a worsened braking effect because of increased holding capacity for hydraulic fluid, the control unit ECU controls the brake system as described above for an automatic braking process. In contrast to a normal automatic braking process, control here takes place so that a quantity of hydraulic fluid is fed to at least one wheel brake, which for this/these wheel brake(s) and a vehicle wheel which works with it/them results in an operational state which leads to anti-lock regulation. If the control unit ECU detects such an operational state which requires anti-lock regulation, the corresponding wheel brake is supplied with hydraulic fluid according to the anti-lock regulation described above.

Advantageously, for at least one wheel brake and/or wheel which is/are associated with a front axle of the vehicle, an operational state which requires anti-lock regulation is achieved.

The quantity of hydraulic fluid which is provided in this embodiment is fed independently of actuations of the brake system by means of the pedal 13. Therefore, even in the case of a braking process which the driver controls, no braking pressure which the driver generates is used to compensate for the increased holding capacity.

Increasing the braking pressure by controlled feeding of hydraulic fluid out of the main cylinder 12, so that anti-lock regulation is necessary in relation to at least one wheel brake, has the advantage that the additionally fed quantity of hydraulic fluid is actually enough to compensate for the increased holding capacity. In the case of a smaller quantity of fed hydraulic fluid, which does not lead to anti-lock regulation, it is possible that less hydraulic fluid is fed than is necessary to compensate for the increased holding capacity.

In accordance with the provisions of the patent statutes, the principle and mode of operation of this invention have been explained and illustrated in its preferred embodiment. However, it must be understood that this invention may be practiced otherwise than as specifically explained and illustrated without departing from its spirit or scope.

The invention claimed is:

1. Hydraulic brake system for a land vehicle comprising:
a control unit with inputs to receive input parameters, which indicate operational states of the land vehicle, and outputs to output control signals for the brake system,
at least one wheel brake,
at least one hydraulic fluid storage device to store hydraulic fluid,
a controllable pump for controlled feeding of hydraulic fluid out of the hydraulic fluid reservoir to the at least one wheel brake, and
a valve arrangement with a first operational state, in which a hydraulic connection to feed braking pressure which a driver generates to the at least one wheel brake is open, and a second operational state, in which the hydraulic connection is blocked, the brake system having a predetermined holding capacity for hydraulic fluid within the brake system and the control unit being set up to determine a current holding capacity for hydraulic fluid from the input parameters, and if the current holding capacity is increased compared with the predetermined holding capacity, to provide control signals for the valve arrangement, to bring the valve arrangement into the second operational state, and to provide control signals for the pump, to feed a quantity of hydraulic fluid corresponding at least to the capacity increase to the at least one wheel brake.

2. Brake system according to claim 1, wherein the control unit is set up to determine the holding capacity increase on the basis of at least one of the following input parameters:
number of actuations of the brake system within a specified period,
amount of braking pressures in the brake system for successive actuations of the brake system,
ratio of rotational speed of the wheels which are associated with the at least one wheel brake and speed and/or deceleration of the land vehicle,
temperature of the at least one wheel brake,
braking pressure generated in a main cylinder of the brake system, and
ratio of deceleration of the land vehicle and braking pressure in a main cylinder of the brake system.

3. Brake system according to claim 1, wherein the control unit determines the current holding capacity during an unactuated operational state of the brake system.

4. Brake system according to claim 2, wherein the control unit is set up to provide control signals for the pump, to feed a first quantity of hydraulic fluid, corresponding to the capacity increase, to the at least one wheel brake during an unactuated operational state of the brake system.

5. Brake system according to claim 2, wherein the hydraulic storage device includes a hydraulic fluid reservoir to supply a main cylinder of the brake system.

6. Brake system according to claim 5, wherein the hydraulic connection is a first hydraulic connection and the system also has a second hydraulic connection between the input side of the pump and the hydraulic fluid reservoir and further wherein
the valve arrangement has a third operational state, in which the first and second connections are blocked, and
the control unit is set up to provide control signals for the valve arrangement, to bring the valve arrangement into the third operational state, and control signals for the pump, to end operation of the pump when the first quantity of hydraulic fluid is fed.

7. Brake system according to claim 6, wherein the control unit is set up to provide the control signals for the pump at an instant which depends on at least one of the input parameters.

8. Brake system according to claim 1, wherein the control unit determines the current holding capacity during an actuated operational state of the brake system.

9. Brake system according to claim 8, wherein the control unit is set up to provide control signals for the pump, to feed a second quantity of hydraulic fluid to the at least one wheel brake during an actuated operational state of the brake system, resulting in an operational state, which requires anti-lock regulation, of at least one of the at least one wheel brake.

10. Brake system according to claim 9,
wherein the control unit is set up to provide, if the valve arrangement has the second operational state, control signals for the pump, to feed the second quantity of hydraulic fluid to the at least one wheel brake.

11. Brake system according to claim 10, wherein the hydraulic storage device includes a low pressure hydraulic fluid reservoir of the brake system.

12. Brake system according to claim 11, wherein the control unit is set up to provide control signals, to feed the second quantity of hydraulic fluid to at least one wheel brake which is provided as a wheel brake for a front axle of the land vehicle.

13. Method of controlling a hydraulic brake system for a land vehicle with at least one wheel brake and a predetermined holding capacity for hydraulic fluid within the brake system, with the following steps being performed by a control unit of the brake system:
determining whether a current holding capacity of the brake system has increased compared with the predetermined holding capacity, and if so
controlled feeding of hydraulic fluid to the at least one wheel brake, in a quantity corresponding at least to the capacity increase, and
preventing actuation of the brake system by a driver while the first quantity of hydraulic fluid is being fed.

14. Method according to claim 13, wherein the current holding capacity is determined during an actuated operational state of the brake system.

15. Method according to claim 13, wherein the holding capacity increase is determined on the basis of at least one of the following parameters:
number of actuations of the brake system within a specified period,
amount of braking pressures in the brake system for successive actuations of the brake system,
ratio of rotational speed of the wheels which are associated with the at least one wheel brake and speed and/or deceleration of the land vehicle,
temperature of the at least one wheel brake,
braking pressure generated in a main cylinder of the brake system, and
ratio of deceleration of the land vehicle and braking pressure in a main cylinder of the brake system.

16. Method according to claim 13, wherein a first quantity of hydraulic fluid corresponding to the capacity increase is fed to the at least one wheel brake.

17. Method according to claim 16, wherein the first quantity of hydraulic fluid is fed at an instant which is determined depending on operational states of the brake system.

18. Method according to claim 16, wherein a second quantity of hydraulic fluid is fed to at least one wheel brake during an actuated operational state of the brake system, resulting in an operational state of this wheel brake which requires anti-lock regulation.

19. Method according to claim 18, wherein the at least one wheel brake to which hydraulic fluid is fed is a front wheel brake.

20. Method according to claim 16, wherein the current holding capacity is determined during an unactuated operational state of the brake system.

21. Method according to claim 20, wherein the first quantity of hydraulic fluid is fed to the brake system during an unactuated operational state of the brake system.

22. Method according to claim 20, wherein the first quantity of hydraulic fluid is kept in the at least one wheel brake until a subsequent actuation of the brake system.

* * * * *